US011530674B2

(12) United States Patent
Moriya et al.

(10) Patent No.: US 11,530,674 B2
(45) Date of Patent: Dec. 20, 2022

(54) START-STOP CONTROL APPARATUS

(71) Applicant: SUBARU CORPORATION, Tokyo (JP)

(72) Inventors: Fumiyuki Moriya, Tokyo (JP); Atsushi Doki, Tokyo (JP); Hirofumi Yabe, Tokyo (JP); Takumi Hoshi, Tokyo (JP); Kazutaka Hara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/404,528

(22) Filed: Aug. 17, 2021

(65) Prior Publication Data

US 2022/0056875 A1    Feb. 24, 2022

(30) Foreign Application Priority Data

Aug. 18, 2020  (JP) ............................. JP2020-137768

(51) Int. Cl.
*F02N 11/08* (2006.01)
(52) U.S. Cl.
CPC ...... *F02N 11/0825* (2013.01); *F02N 11/0862* (2013.01); *F02N 2200/023* (2013.01); *F02N 2200/046* (2013.01); *F02N 2200/061* (2013.01); *F02N 2200/124* (2013.01)
(58) Field of Classification Search
None
See application file for complete search history.

(56) References Cited

U.S. PATENT DOCUMENTS

| 7,107,956 | B2 * | 9/2006 | McGee | B60W 10/06 |
| | | | | 180/65.235 |
| 8,330,468 | B2 * | 12/2012 | Mizuno | F02N 11/0818 |
| | | | | 320/132 |
| 8,770,165 | B2 * | 7/2014 | Mizuno | F02D 29/06 |
| | | | | 701/113 |
| 10,012,201 | B1 * | 7/2018 | Chen | F02N 11/0818 |
| 10,661,778 | B2 * | 5/2020 | Morisaki | B60W 30/194 |
| 10,696,293 | B2 * | 6/2020 | Okumura | F02D 41/042 |
| 10,737,582 | B2 * | 8/2020 | Morisaki | B60K 6/24 |
| 2006/0021808 | A1 * | 2/2006 | McGee | F02N 11/0825 |
| | | | | 180/65.265 |

(Continued)

FOREIGN PATENT DOCUMENTS

| CN | 101871396 A | * 10/2010 | ............ F02D 29/06 |
| CN | 101871396 B | * 12/2014 | ............ F02D 29/06 |

(Continued)

*Primary Examiner* — Kevin R Steckbauer
(74) *Attorney, Agent, or Firm* — McDermott Will & Emery LLP

(57) ABSTRACT

Provided is a start-stop control apparatus to be mounted in a vehicle including an engine, a starter motor configured to restart the engine, and an auxiliary battery configured to supply electric power to the starter motor. The start-stop control apparatus includes a stop processing unit and an engine measuring unit. The stop processing unit stops idling of the engine while the vehicle is being stopped. The engine measuring unit measures an internal loss of the engine. The stop processing unit determines whether to stop the idling of the engine on the basis of the internal loss measured by the engine measuring unit and the state of charge of the auxiliary battery.

9 Claims, 10 Drawing Sheets

(56) References Cited

U.S. PATENT DOCUMENTS

| | | | | |
|---|---|---|---|---|
| 2010/0217484 | A1* | 8/2010 | Mizuno | F02N 11/0818 701/36 |
| 2010/0269776 | A1* | 10/2010 | Mizuno | F02N 11/0825 701/113 |
| 2016/0272210 | A1* | 9/2016 | Matsushita | B60W 10/26 |
| 2019/0168616 | A1* | 6/2019 | Morisaki | B60W 50/0097 |
| 2019/0168735 | A1* | 6/2019 | Morisaki | B60W 20/12 |
| 2019/0315339 | A1* | 10/2019 | Okumura | F02D 41/062 |
| 2021/0199082 | A1* | 7/2021 | Chen | F02N 11/0862 |
| 2022/0056875 | A1* | 2/2022 | Moriya | F02N 11/0825 |
| 2022/0056876 | A1* | 2/2022 | Takeuchi | F02N 11/0825 |

FOREIGN PATENT DOCUMENTS

| | | | | |
|---|---|---|---|---|
| CN | 105984467 A | * | 10/2016 | B60W 10/02 |
| CN | 108730092 A | * | 11/2018 | F02N 11/0818 |
| CN | 109866755 A | * | 6/2019 | B60K 6/445 |
| CN | 109878495 A | * | 6/2019 | B60K 6/24 |
| CN | 110316177 A | * | 10/2019 | B60K 6/48 |
| CN | 110356384 A | * | 10/2019 | B60K 6/20 |
| CN | 109878495 B | * | 1/2022 | B60K 6/24 |
| DE | 102005032205 A1 | * | 3/2006 | B60K 6/445 |
| DE | 102010000523 A1 | * | 9/2010 | F02N 11/0818 |
| DE | 102010016564 A1 | * | 11/2010 | F02D 29/06 |
| DE | 102005032205 B4 | * | 5/2018 | B60K 6/445 |
| DE | 102018109156 A1 | * | 10/2018 | F02N 11/0818 |
| EP | 3495653 A1 | * | 6/2019 | B60K 6/24 |
| EP | E P-3495217 A1 | * | 6/2019 | B60K 6/445 |
| EP | 3495653 B1 | * | 3/2021 | B60K 6/24 |
| FR | 2965309 A1 | * | 3/2012 | F02N 11/006 |
| FR | 2985110 A1 | * | 6/2013 | F02N 11/04 |
| GB | 2416808 A | * | 2/2006 | B60K 6/445 |
| JP | 2001-98986 A | | 4/2001 | |
| JP | 2001098986 A | * | 4/2001 | |
| JP | 2001304008 A | * | 10/2001 | F02N 11/0825 |
| JP | 3589143 B2 | * | 11/2004 | B60K 6/48 |
| JP | 2006046342 A | * | 2/2006 | B60K 6/445 |
| JP | 4424573 B2 | * | 3/2010 | F02N 11/0825 |
| JP | 2010270747 A | * | 12/2010 | F02D 29/06 |
| JP | 4819433 B2 | * | 11/2011 | B60K 6/445 |
| JP | 2016176394 A | * | 10/2016 | B60W 10/02 |
| JP | 2019099014 A | * | 6/2019 | B60K 6/445 |
| JP | 2019099015 A | * | 6/2019 | B60K 6/24 |
| JP | 2022034123 A | * | 3/2022 | F02N 11/0825 |
| WO | WO-2013113600 A1 | * | 8/2013 | F02N 11/0825 |
| WO | WO-2015079295 A1 | * | 6/2015 | F02D 41/042 |

* cited by examiner

… … …

START-STOP CONTROL APPARATUS

CROSS-REFERENCE TO RELATED APPLICATIONS

The present application claims priority from Japanese Patent Application No. 2020-137768 filed on Aug. 18, 2020 the entire contents of which are hereby incorporated by reference.

BACKGROUND

The technology relates to a start-stop control apparatus.

A start-stop control apparatus has been known that stops idling of an engine while a vehicle is being temporary stopped. The fuel economy of the vehicle is improved by stopping idling of the engine.

Japanese Unexamined Patent Application Publication No. 2001-098986 discloses a technique of determining whether an internal loss or a frictional loss of the engine has increased upon the engine being started.

SUMMARY

An aspect of the technology provides a start-stop control apparatus to be mounted in a vehicle including an engine, a starter motor configured to restart the engine, and an auxiliary battery configured to supply electric power to the starter motor. The start-stop control apparatus includes a stop processing unit and an engine measuring unit. The stop processing unit is configured to stop idling of the engine while the vehicle is being stopped. The engine measuring unit is configured to measure an internal loss of the engine. The stop processing unit is configured to perform a determination process of determining whether to stop the idling of the engine on the basis of the internal loss measured by the engine measuring unit and the state of charge of the auxiliary battery.

An aspect of the technology provides a start-stop control apparatus to be mounted in a vehicle including an engine, a starter motor configured to restart the engine, and an auxiliary battery configured to supply electric power to the starter motor. The start-stop control apparatus includes circuitry configured to stop idling of the engine while the vehicle is being stopped, and measure an internal loss of the engine. The circuitry is configured to perform a determination process of determining whether to stop the idling of the engine on the basis of the internal loss measured and the state of charge of the auxiliary battery.

BRIEF DESCRIPTION OF THE DRAWINGS

The accompanying drawings are included to provide a further understanding of the technology and are incorporated in and constitute a part of this specification.

The drawings illustrate example embodiments and, together with the specification, serve to explain the principles of the technology.

DETAILED DESCRIPTION

To stop idling of an engine, it is generally determined if the state of charge (SOC) of an auxiliary battery is greater than or equal to an threshold SOC. If the SOC of the auxiliary battery is greater than or equal to the threshold SOC, the engine is stopped from idling. The threshold SOC is set to a value of electric power required to restart the engine. Such a determination helps prevent a failure in restarting the engine due to a shortage of electric power after the engine is stopped from idling.

Meanwhile, the electric power required to restart the engine changes depending on an internal loss of the engine. The internal loss of the engine changes depending on the total travel distance, the age of service, and the maintenance conditions of the vehicle. For example, a large internal loss is measured when the vehicle is newly purchased, whereas a small internal loss is measured after the vehicle has traveled some distance. The internal loss changes also depending on a change in the viscosity of the engine oil caused by replacement or deterioration, for example.

However, a typical start-stop control apparatus determines the threshold SOC on the basis of an estimated largest internal loss. Thus, in a case where the internal loss of the engine is small, the determination as to whether to stop idling is made with a determination margin larger than necessary. A large determination margin can cause an erroneous determination that it is impossible to stop idling even though it is practically possible. This can reduce the chances to stop idling.

It is desirable to provide a start-stop control apparatus that makes it possible to increase the chances to stop idling.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[First Example Embodiment]

Figure 1:
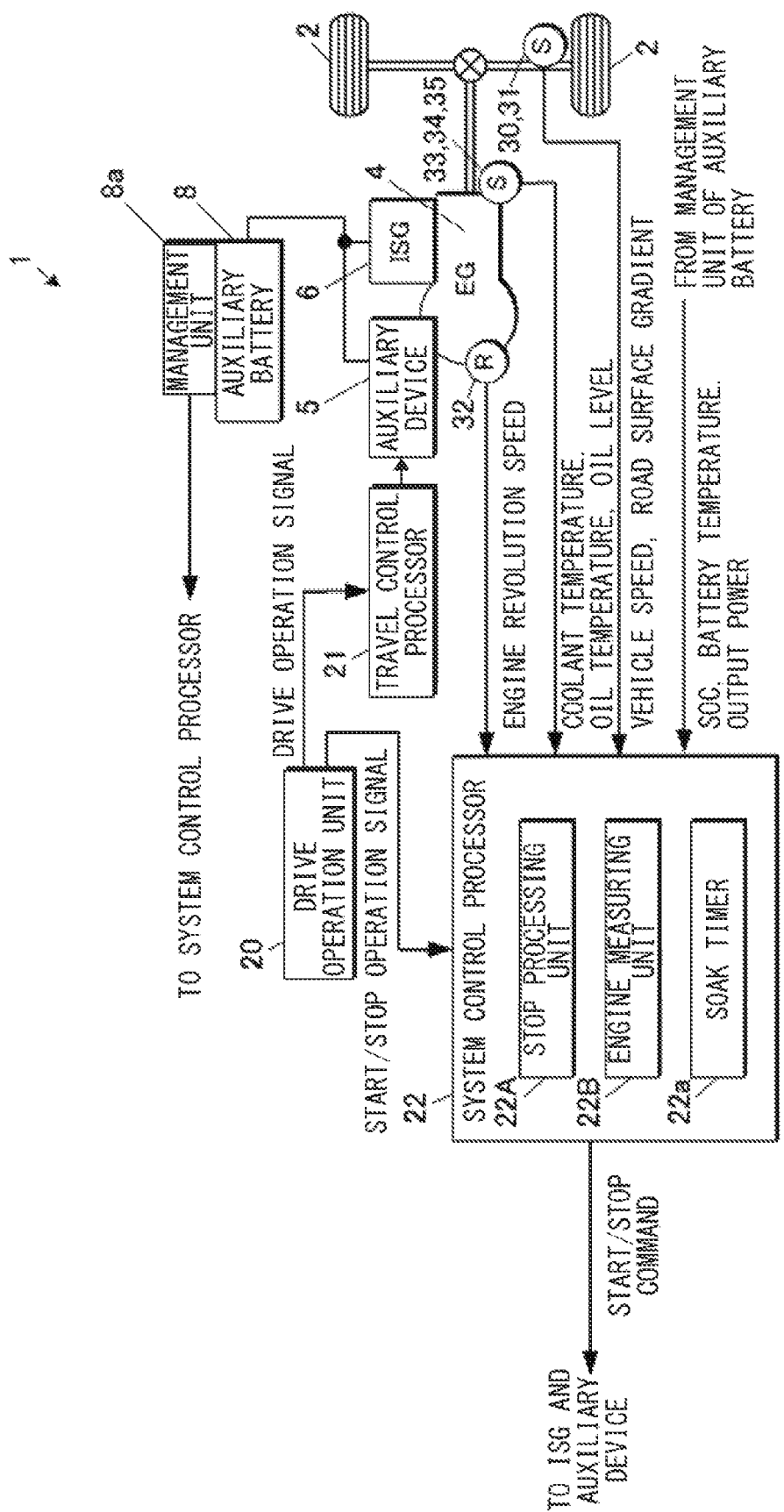
FIG. 1 is a block diagram illustrating an exemplary configuration of a vehicle including a start-stop control apparatus according to one example embodiment of the technology.

FIG. 1 illustrates a vehicle 1 including a start-stop control apparatus according to a first example embodiment of the technology. The vehicle 1 according to the first example embodiment may include drive wheels 2, an engine 4 that outputs drive power to the drive wheels 2, an auxiliary device 5 that drives the engine 4, an integrated starter generator (ISG) 6 that starts or restarts the engine 4, an auxiliary battery 8 that supplies electric power to the ISG 6 and the auxiliary device 5, a drive operation unit 20 that receives drive operations performed by the driver, a travel control processor 21 that controls traveling of the vehicle 1, and a system control processor 22 that controls the system of the vehicle 1. In one embodiment, the system control processor 22 may serve as a "start-stop control apparatus". The system control processor 22 includes a stop processing unit 22A that performs start-stop control, and an engine measuring unit 22B that measures an internal loss of the engine 4. The ISG 6 may serve as a starter motor. The starter motor may be also referred to as a restarter motor.

The vehicle 1 may further include a vehicle speed sensor 30, a gradient sensor 31 that detects the gradient of a traveling road surface, a revolution sensor 32 that detects the revolution speed of the engine 4, a liquid temperature sensor 33 that measures the temperature of the coolant in the engine 4, an oil temperature sensor 34 that measures the temperature of the oil in the engine 4, and a level sensor 35 that detects the level of the oil in the engine 4.

The auxiliary battery 8 may be a lead-acid battery that outputs a voltage of 12 V, for example. The auxiliary battery 8 may include a management unit 8a that manages the SOC by monitoring a current, a voltage, and a temperature. The management unit 8a may send data on the temperature, current, voltage, and SOC of the auxiliary battery 8 to the system control processor 22.

The ISG 6 may serve as an electric motor that starts or restarts the engine 4 and as a power generator that generates electric power by receiving part of the drive power of the vehicle 1. For example, the ISG 6 may be driven by electric power from the auxiliary battery 8. The electric power generated by the ISG 6 may be accumulated in the auxiliary battery 8.

The drive operation unit 20 may include an accelerator operation section, a brake operation section, and a steering operation section. When the accelerator operation section is operated by the driver, the drive operation unit 20 may output an operation signal indicating the amount of operation on the accelerator operation section to the travel control processor 21. In response to the operation signal from the accelerator operation section, the travel control processor 21 may drive the auxiliary device 5 to control the output torque of the engine 4. Such control enables the vehicle 1 to travel in accordance with drive operations.

The drive operation unit 20 may further include a start operation section such as an ignition key cylinder or a start button. When the start operation section is operated by the driver, the drive operation unit 20 may send an operation signal to the system control processor 22. In response to the operation signal, the system control processor 22 may start or stop the system of the vehicle 1. When the system is started, the travel control processor 21 may cause the vehicle 1 to be ready to travel in accordance with drive operations. When the system is stopped, the travel control processor 21 may be stopped not to cause the vehicle 1 to travel even when any drive operation is made. Upon the start of the system, the system control processor 22 may start the engine 4 by driving the ISG 6. Alternatively, the engine 4 may be started at another timing.

The system control processor 22 may further include a soak timer 22a. The soak timer 22a may measure the time from a stop of the system to a restart of the system.

[Start-Stop Control]

Figure 2:
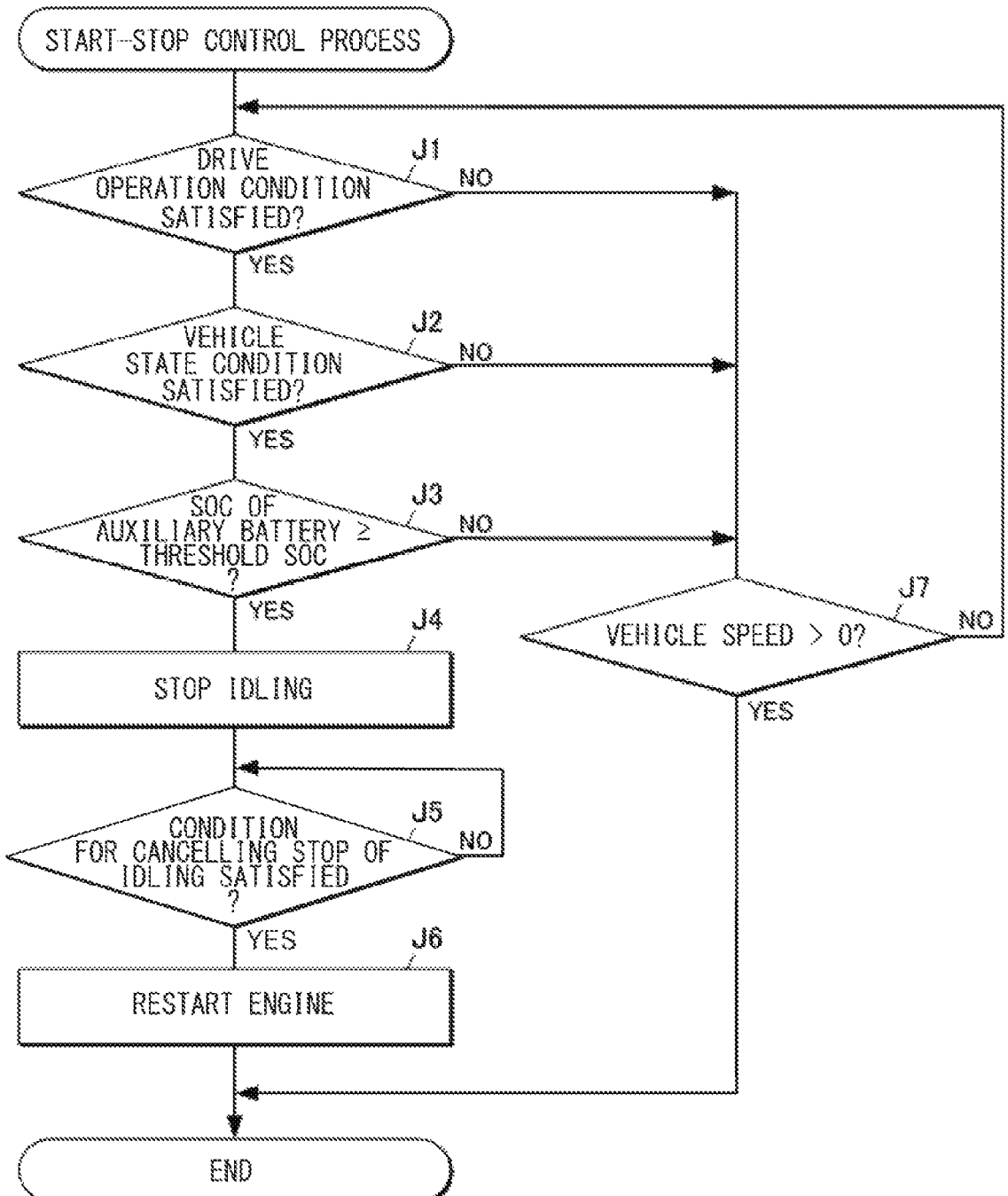
FIG. 2 is a flowchart of a start-stop control process performed by a system control processor in the start-stop control apparatus according to the example embodiment of the technology.

FIG. 2 is a flowchart of a start-stop control process performed by the system control processor 22. The system control processor 22 may start the start-stop control process illustrated in FIG. 2 when the speed of the traveling vehicle 1 reaches zero. Upon the start of the start-stop control process, the stop processing unit 22A may determine whether a predetermined condition about a drive operation (hereinafter referred to as a drive operation condition) for stopping idling is satisfied (Step J1). For example, the drive operation condition may be a condition that the operation amount of the brake operation section greater than or equal to a predetermined amount has been maintained for a predetermined time or longer (e.g., a few seconds). Further, the stop processing unit 22A may determine whether the state of the vehicle 1 satisfies a predetermined vehicle state condition (Step J2). For example, the vehicle state condition may be a condition that the vehicle 1 is traveling on a road surface with a gradient less than or equal to a predetermined value. Further, the stop processing unit 22A may determine whether the SOC of the auxiliary battery 8 is greater than or equal to a threshold SOC (Step J3). If all of the results of determinations in Steps J1 to J3 indicate "YES", the stop processing unit 22A may stop the engine from idling (Step J4). In contrast, in a case where any of the results of determinations in Steps J1 to J3 indicates "NO" and where the vehicle 1 restarts traveling (Step J7: YES), the start-stop control process may end without performing other steps. After stopping the engine from idling in Step J4, the system control processor 22 may repeat a determination as to whether a condition for cancelling the stop of idling is satisfied (e.g., whether the brake operation on the brake operation section has been cancelled) (Step J5). If the condition for cancelling the stop of idling is satisfied, the system control processor 22 may restart the engine 4 (Step J6), and end the start-stop control process.

The threshold SOC used in the determination in Step J3 may be calculated by adding a margin to the SOC of the auxiliary battery 8 required to restart the engine 4. Such a determination using the threshold SOC helps prevent a failure in restarting the engine 4 due to a shortage of the SOC of the auxiliary battery 8 after the engine is stopped from idling.

It is unknown in the start-stop control when the engine 4 will be restarted after being stopped from idling. Thus, the threshold SOC used in the above-described determination may be set assuming that the engine 4 would be sufficiently cooled before being restarted.

The SOC of the auxiliary battery 8 required to restart the engine 4 may change depending on an internal loss of the engine 4. The internal loss of the engine 4 may change depending on the total travel distance, the age of service, and the maintenance conditions of the vehicle 1. For example, a large internal loss may be measured when the vehicle 1 is newly purchased, whereas a small internal loss may be measured after the vehicle 1 has traveled some distance. The internal loss may change also depending on a change in the viscosity of the engine oil caused by replacement or deterioration, for example. Thus, setting the threshold SOC on which a current internal loss is reflected enables the determination in Step J3 to be properly made.

The internal loss of the engine 4 may change in a short cycle in a heating environment in which the engine 4 is heated or a cooling environment in which the engine 4 is cooled to be cooler than the engine in the heating environment, for example. However, the term "current internal loss" used herein may refer to a fiducial value of the internal loss that changes over a long time rather than in a short cycle. For example, the current internal loss may refer to an internal loss measured fixing a temperature parameter.

As described above, it is unknown in the start-stop control when the engine 4 will be restarted after being stopped from idling. Thus, the threshold SOC should be set to a value enough to restart the engine 4 being sufficiently cooled. Such a threshold SOC is free from the influence of the internal loss changing in a short cycle.

[Measurement of Engine Internal Loss]

Figure 3:
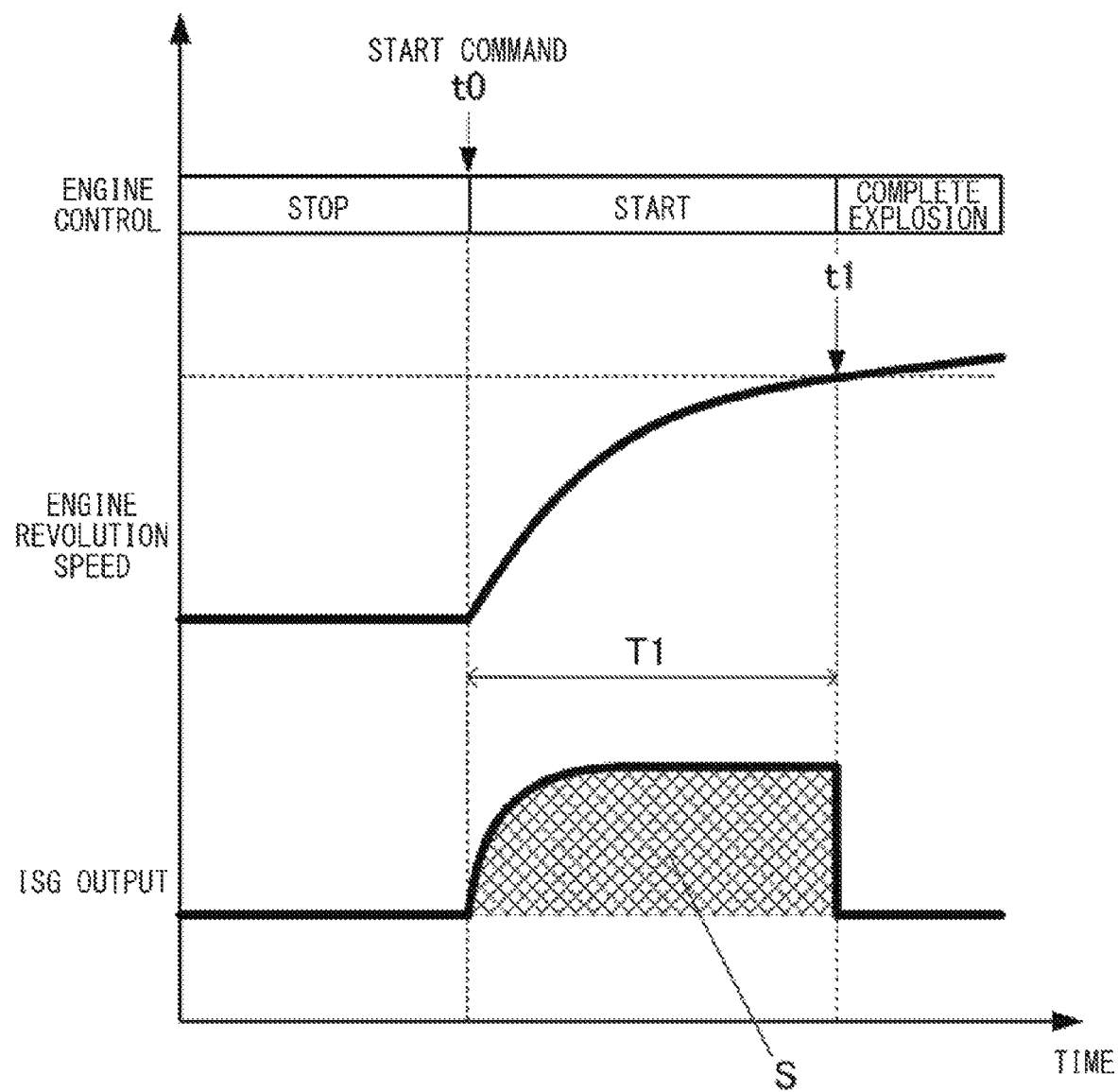
FIG. 3 is a time chart illustrating an internal loss measuring process according to the example embodiment of the technology.

FIG. 3 is a time chart illustrating a process of measuring the internal loss of the engine 4. As illustrated in FIG. 3, a start command may be issued at a timing t0. In response to the start command, the ISG 6 may be driven by the electric power from the auxiliary battery 8 to output rotative power to the engine 4, increasing the revolution speed of the engine 4 during a time T1. After the revolution speed of the engine 4 starts increasing, the auxiliary device 5 may perform fuel injection and ignition operations. The engine 4 may be thereby brought into a complete explosion state in which the engine 4 is rotated only by a fuel explosion at a timing t1. The complete explosion of the engine 4 may be identified from the fact that the revolution speed of the engine 4 has increased to a threshold for the complete explosion or greater, or a phase difference between the ignition timing and the crank timing, for example.

In the time T1 before the complete explosion of the engine 4, the engine measuring unit 22B may calculate the internal loss of the engine 4 on the basis of the output energy of the ISG 6 and the rise rate of the revolution speed of the engine 4. The output energy of the ISG 6 may be calculated from the output power of the auxiliary battery 8 (i.e., the power consumption of the ISG 6), for example. If the internal loss of the engine 4 is large, the rise rate of the revolution speed of the engine 4 may not increase with respect to the output energy of the ISG 6. In contrast, if the internal loss of the engine is small, the rise rate of the revolution speed of the engine 4 may increase with respect to the output energy of the ISG 6. That is, the value obtained by standardizing the rise rate of the revolution speed of the engine 4 with the output energy of the ISG 6 may have a correlation with the internal loss of the engine 4, and may thus be used to calculate the internal loss. The engine measuring unit 22B may preliminarily hold an arithmetic function or a data table indicating the correlation between the standardized value and the internal loss. The engine measuring unit 22B may calculate the internal loss using the arithmetic function or the data table. The arithmetic function or the data table may be obtained through an experiment or a simulation.

Alternatively, the engine measuring unit 22B may calculate the internal loss of the engine 4 using other parameters in the time T1 before the complete explosion of the engine 4. The other parameters may include, for example, a time from the start to the complete explosion of the engine 4, the quantity of work of the ISG 6 from the start to the complete explosion of the engine 4 (corresponding to an area S in FIG. 3), and the rate of change in the revolution speed of the engine 4 upon the start of the engine 4 (e.g., an average value among values indicated by a curve).

Because these parameters each have a correlation with the internal loss of the engine 4, the engine measuring unit 22B may calculate the internal loss of the engine 4 using the arithmetic function or the data table preliminarily held therein and indicating the correlation between each parameter and an internal loss of the engine 4. The arithmetic function or the data table may be obtained through an experiment or a simulation.

The engine measuring unit 22B performs the internal loss measuring process when a predetermined environmental condition about the engine 4 is satisfied. That is, the engine measuring unit 22B may perform the internal loss measuring process excluding elements that change depending on environments (hereinafter referred to as environment-dependent elements). In the first example embodiment, the predetermined environmental condition may be a condition that the engine 4 is in a cold-start state (hereinafter referred to as a cold-start condition), for the easiness of setting the condition. For example, the engine measuring unit 22B may perform the internal loss measuring process in a case where the engine 4 is started for the first time after a start-up of the system, where the value of the soak timer 22a at the start-up of the system (i.e., the time from a previous stop to the start-up of the system) is greater than or equal to a threshold value, and where the temperature of the coolant in the engine 4 is less than or equal to a threshold temperature. The threshold value of the soak timer 22a may be set to a time length in which the heat generated by driving the engine 4 is sufficiently released to the outside. The threshold temperature of the coolant may be set to a temperature of the coolant after the heat generated by driving the engine 4 is sufficiently released to the outside.

Further, the engine measuring unit 22B may refrain from performing the internal loss measuring process when the predetermined environmental condition is not satisfied, i.e., when the following exceptional conditions are satisfied. Alternatively, the engine measuring unit 22B may perform the internal loss measuring process even when the following exceptional conditions are satisfied, but the stop processing unit 22A may refrain from using the measurement value to determine the threshold SOC. The exceptional conditions may include a condition that the gradient of the road surface is greater than or equal to a threshold gradient, a condition that the oil level inside the crank case is lower than a threshold level, and a condition that there is a difference greater than or equal to a threshold among the temperature of the coolant in the engine 4, the temperature of the oil in the engine 4, the ambient temperature outside the engine 4, and the temperature of the auxiliary battery 8.

In a case where the gradient of the road surface is greater than or equal to the threshold gradient, the state of the oil hitting a connecting rod of the engine 4 may change from an ordinary state, generating an error in the measured internal loss of the engine 4. In a case where the oil level in the crank case is low, the amount of the oil hitting the connection rod may decrease, causing the internal loss to be erroneously measured at a low level. Such an erroneous measurement of the internal loss at a low level can generate an inconvenience that the engine 4 will not be restarted even after a determination is made that it is possible to restart the engine 4. The condition that there is a difference greater than or equal to the threshold among the temperature of the coolant in the engine 4, the temperature of the oil in the engine 4, the ambient temperature outside the engine 4, and the temperature of the auxiliary battery 8 does not match with the cold-start condition. For these reasons, the engine measuring unit 22B may recognize these conditions as the exceptional conditions.

[Ready-On Process]

Figure 4:
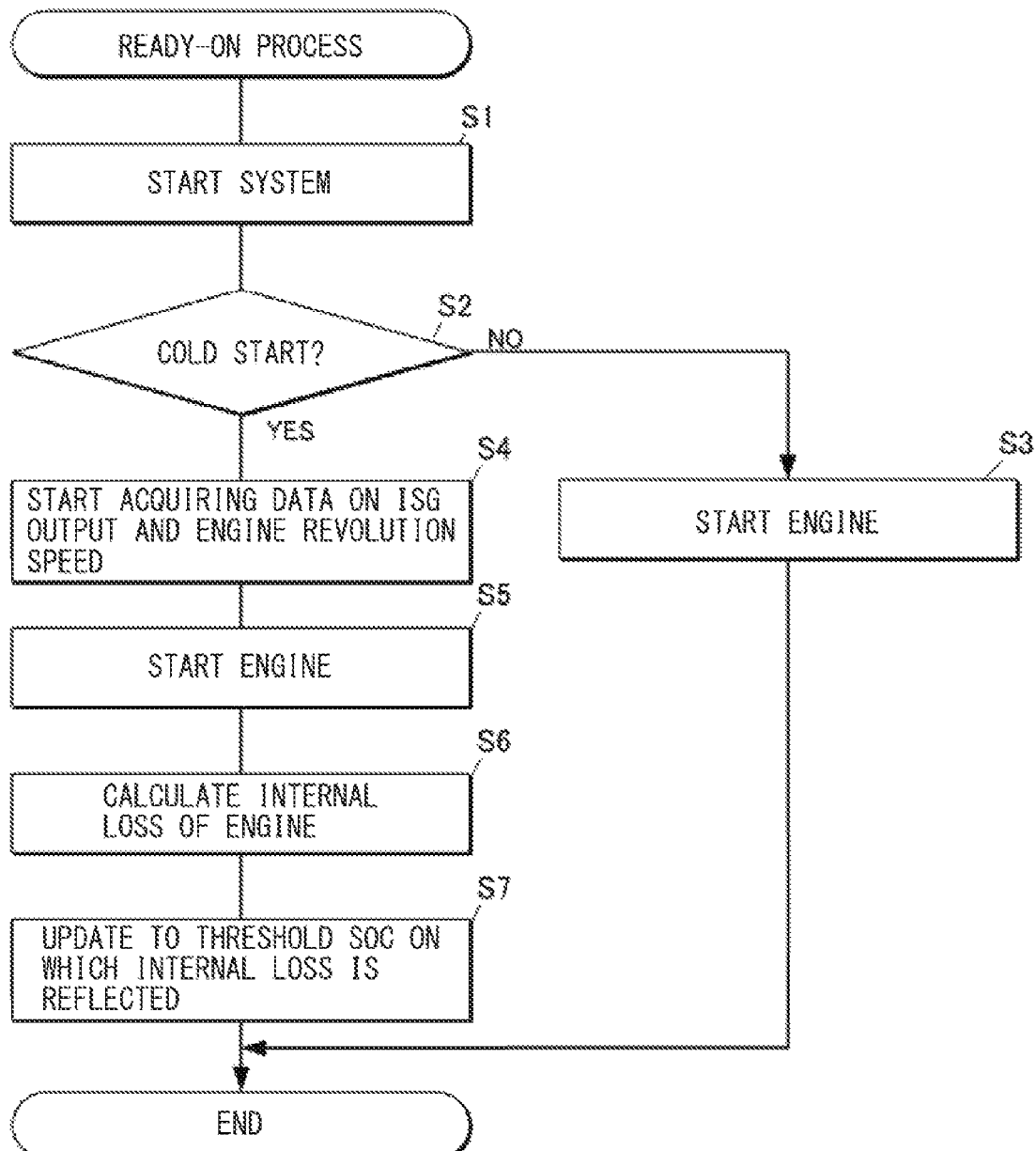
FIG. 4 is a flowchart of a ready-on process performed by the system control processor of the start-stop control apparatus according to one example embodiment of the technology.

Next, a process performed at a ready-on time (hereinafter referred to as a ready-on process) is described. In the ready-on process, the internal loss of the engine 4 may be measured by the engine measuring unit 22B, and the threshold SOC may be updated by the stop processing unit 22A. FIG. 4 is a flowchart of the ready-on process performed by the system control processor 22.

The ready-on process may start in response to an operation to start the system. Upon the start of the ready-on process, the system control processor 22 may perform a system start-up process to start operating the other control processors (Step S1). Thereafter, the engine measuring unit 22B may determine whether the cold-start condition is satisfied (Step S2). If the cold-start condition is not satisfied (Step S2: NO), the system control processor 22 may start the engine 4 (Step S3) without performing the remaining steps, and end the ready-on process. In contrast, if the cold-start condition is satisfied (Step S2: YES), the engine measuring unit 22B may cause the process to branch to Step S4. The determination in Step S2 as to whether the cold-start condition is satisfied may be made on the basis of the value of the soak timer 22a and the temperature of the coolant in the same way as described above. Alternatively, the determination in Step S2 may further include a determination as to whether the exceptional conditions described above are satisfied. If the exceptional conditions are satisfied, the process may branch to Step S3.

In Step S4, the engine measuring unit 22B may obtain data on the output of the ISG 6 and the revolution speed of the engine 4. Thereafter, in Step 5, the system control processor 22 may start the engine 4. In this step, the engine 4 may be brought into the complete explosion state before being started. Thereafter, in Step S6, the engine measuring unit 22B may calculate the internal loss of the engine 4 using the data table or the arithmetic function preliminarily held therein on the basis of the data on the output of the ISG 6 and the revolution speed of the engine 4 obtained at several time points from Step S4 until the complete explosion of the engine 4. Alternatively, the internal loss may be calculated in Step S6 on the basis of the other parameters described above.

On the basis of the calculated internal loss, the stop processing unit 22A may calculate a new threshold SOC, which will be used to determine whether to stop idling, and update the currently-set threshold SOC to the new threshold SOC in Step S7. The new threshold SOC may be calculated by adding a predetermined margin to the SOC of the auxiliary battery 8 required to restart the engine 4 sufficiently cooled after being stopped from idling. The internal loss calculated in Step S6 may correspond to an internal loss of the engine 4 in the cooling environment, and thus have a correlation with the SOC of the auxiliary battery 8 required to restart the engine 4 sufficiently cooled after being stopped from idling. The stop processing unit 22A may preliminarily hold the arithmetic function or a data table indicating the correlation between the internal loss of the engine 4 in the cooling environment and the threshold SOC optimized to the measured internal loss. The stop processing unit 22A may determine the threshold SOC corresponding to the calculated internal loss on the basis of the arithmetic function or the data table. The arithmetic function or the data table may be determined through an experiment or a simulation. After the threshold SOC is updated in Step S7, the ready-on process may end.

In the ready-on process described above, the internal loss of the engine 4 may be measured when the predetermined environmental condition is satisfied, e.g., when the cold-start condition is satisfied, and the threshold SOC may be updated to the new one on which the measured internal loss is reflected. Thereafter, the updated threshold SOC may be used to determine whether to stop idling in the start-stop control process illustrated in FIG. 2.

According to the vehicle 1 and the system control processor (start-stop control apparatus) 22 of the first example embodiment described above, the engine measuring unit 22B measures the internal loss of the engine 4. The stop processing unit 22A may determine the threshold SOC on the basis of the measured internal loss of the engine 4. The stop processing unit 22A determines whether to stop idling by comparing the SOC of the auxiliary battery 8 with the threshold SOC. In other words, the stop processing unit 22A determines whether to stop idling on the basis of the measured internal loss of the engine 4 and the SOC of the auxiliary battery 8. Such a determination on which the measured internal loss is reflected includes a determination margin smaller than that in the determination based on an estimated largest internal loss. Thus, the determination to stop idling is made more frequently even though the SOC of the auxiliary battery 8 has lowered close to a lower limit SOC barely enough to restart the engine 4. Accordingly, it is possible to increase the chances to stop idling.

Further, according to the vehicle 1 and the system control processor 22 of the first example embodiment described above, the engine measuring unit 22B may measure the internal loss upon the start of the engine 4. That is, the internal loss may be measured by utilizing the movement of the engine 4 upon starting. This eliminates the need to drive the engine 4 only for the measurement, and thus reduces the electric power consumption in the measurement. This contributes to an improvement in the fuel economy of the vehicle 1.

Further, according to the vehicle 1 and the system control processor 22 of the first example embodiment described above, the engine measuring unit 22B may determine whether the predetermined environmental condition about the engine 4 (e.g., the cold-start condition) is satisfied. If the predetermined environmental condition is satisfied, the engine measuring unit 22B may measure the internal loss of the engine 4. The internal loss of the engine 4 may include the environment-dependent elements that change depending on environments, such as the heating environment or cooling environment of the engine 4. Thus, according to the first example embodiment described above, the threshold SOC may be calculated by adding a predetermined margin to the SOC of the auxiliary battery 8 required to restart the engine 4 sufficiently cooled after being stopped from idling. Such a threshold SOC has no correlation with the environment-dependent elements of the internal loss of the engine 4 that change in a short cycle. Accordingly, it is possible to measure the internal loss of the engine 4 excluding the environment-dependent elements that change in a short cycle by measuring the internal loss of the engine 4 when the predetermined environmental condition is satisfied. On the basis of the internal loss measured as described above, the stop processing unit 22A makes it possible to readily determine an appropriate threshold SOC.

Note that the predetermined environmental condition about the engine 4 for the measurement of the internal loss should not be limited to the cold-start condition described above. Alternatively, the predetermined environmental condition may be a condition that the coolant in the engine 4 has a predetermined temperature fixed at a middle or high level, for example. Even in such a case, it is possible to obtain effects similar to those of the measurement performed when the predetermined environment condition is satisfied. Still alternatively, the predetermined environmental condition about the engine 4 may include a condition about parameters other than temperature. For example, the predetermined environmental condition may include a condition that the road surface on which the vehicle 1 is traveling has a gradient less than a predetermined angle, or a condition that the oil level in the crank case is less than a predetermined level.

Further, according to the vehicle 1 and the system control processor 22 of the first example embodiment described above, the gradient sensor 31 may be provided, and the engine measuring unit 22B may refrain from measuring the internal loss of the engine 4 if the road gradient is greater than or equal to the threshold gradient. Alternatively, the engine measuring unit 22B may measure the internal loss of the engine even if the road gradient is greater than or equal to the threshold gradient, but the stop processing unit 22A may refrain from using the measurement value to determine the threshold SOC. In other words, the internal loss of the engine 4 measured when the road gradient is greater than or equal to the threshold gradient does not affect the determination as to whether to stop idling. In general, if the vehicle is traveling on a road with a gradient greater than or equal to the predetermined gradient, the surface level of the engine oil in the crank case changes, which affects the internal loss of the engine 4. However, according to the first example embodiment described above, the control to stop idling is not performed while the vehicle is traveling on the road with the gradient greater than or equal to the predetermined gradient. Thus, the stop processing unit 22A makes it possible to determine an appropriate threshold SOC on the basis of an appropriate internal loss.

[Modification Example 1]

Figure 5:
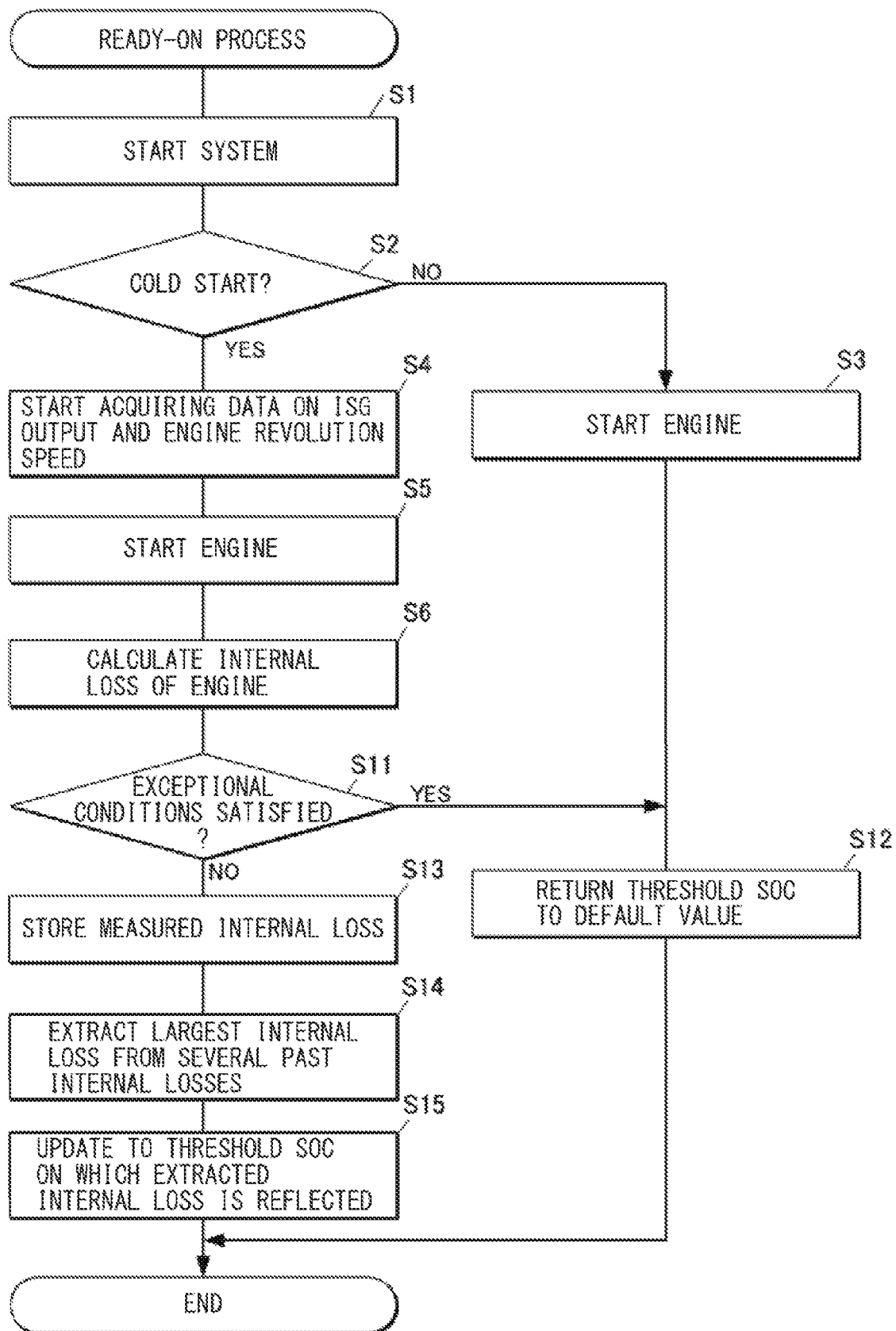
FIG. 5 is a flowchart of a ready-on process according to one modification example of the example embodiment of the technology.

FIG. 5 is a flowchart illustrating a ready-on process according to Modification Example 1 of the first example embodiment. The ready-on process of Modification Example 1 may differ from the ready-on process according to the first example embodiment in that the updated threshold SOC is calculated on the basis of several past internal losses of the engine 4, and the updated threshold SOC is reset in every driving cycle. The term "driving cycle" used herein may refer to one cycle from a start to a stop of the system of the vehicle 1. Some of the steps in the ready-on process illustrated in FIG. 5 that are similar to those in the ready-on process illustrated in FIG. 4 are denoted with the same reference numerals to omit the description thereof.

In the ready-on process of Modification Example 1, the engine measuring unit 22B may measure an internal loss of the engine 4 in Step S6. After Step S6, the stop processing unit 22A may determine whether the exceptional conditions are satisfied (Step S11). As described above, the exceptional conditions may include the condition that the road gradient is greater than or equal to the threshold gradient, and the condition that the oil level is less than or equal to the threshold level, for example. If it is determined that the exceptional conditions are satisfied in Step S11 (Step S11: YES) or in a case where it is not determined that the cold-start condition is satisfied in Step S2 (Step S2: NO) and where the engine 4 is started in Step S3, the stop processing unit 22A may return the threshold SOC to the default threshold SOC (Step S12). The default threshold SOC may include a large determination margin set before the delivery of the vehicle to an owner, for example. The ready-on process may then end.

In contrast, if it is not determined that the exceptional conditions are satisfied in Step S11 (Step S11: NO), the engine measuring unit 22B may store the measured internal loss together with a corresponding serial number of the system start-up in a storage (Step S13). Such a storing process may be performed even after the system is stopped.

Thereafter, the stop processing unit 22A may retrieve several latest internal losses measured in the past from the storage, and extract the largest internal loss from the past internal losses retrieved from the storage (Step S14). The stop processing unit 22A may calculate a new threshold SOC on the basis of the extracted internal loss, and update the currently-set threshold SOC to the new one (Step S15). The calculation of the threshold SOC in Step S15 may be performed as in Step S7 except that different internal losses are used.

According to the vehicle 1 and the system control processor 22 of Modification Example 1 described above, the updated threshold SOC may be calculated on the basis of the largest internal loss extracted from the past internal losses of the engine 4. Therefore, even though the measured internal loss includes a large error by any chance, it is possible to reduce the occurrence of failures in restarting the engine 4 after being stopped from idling due to a low threshold SOC based on the large error.

Further, according to the vehicle 1 and the system control processor 22 of Modification Example 1 described above, the threshold SOC may be reset in every driving cycle. Thus, even if it becomes difficult to stop idling due to an inappropriate threshold SOC, such as a too high threshold SOC, being set based on the measured internal loss including an error, the inappropriate threshold SOC may be reset to the default threshold SOC by restarting the system of the vehicle 1. Accordingly, it is possible to help prevent the situation in which it is difficult to stop idling from being prolonged.

[Modification Example 2]

Figure 6:
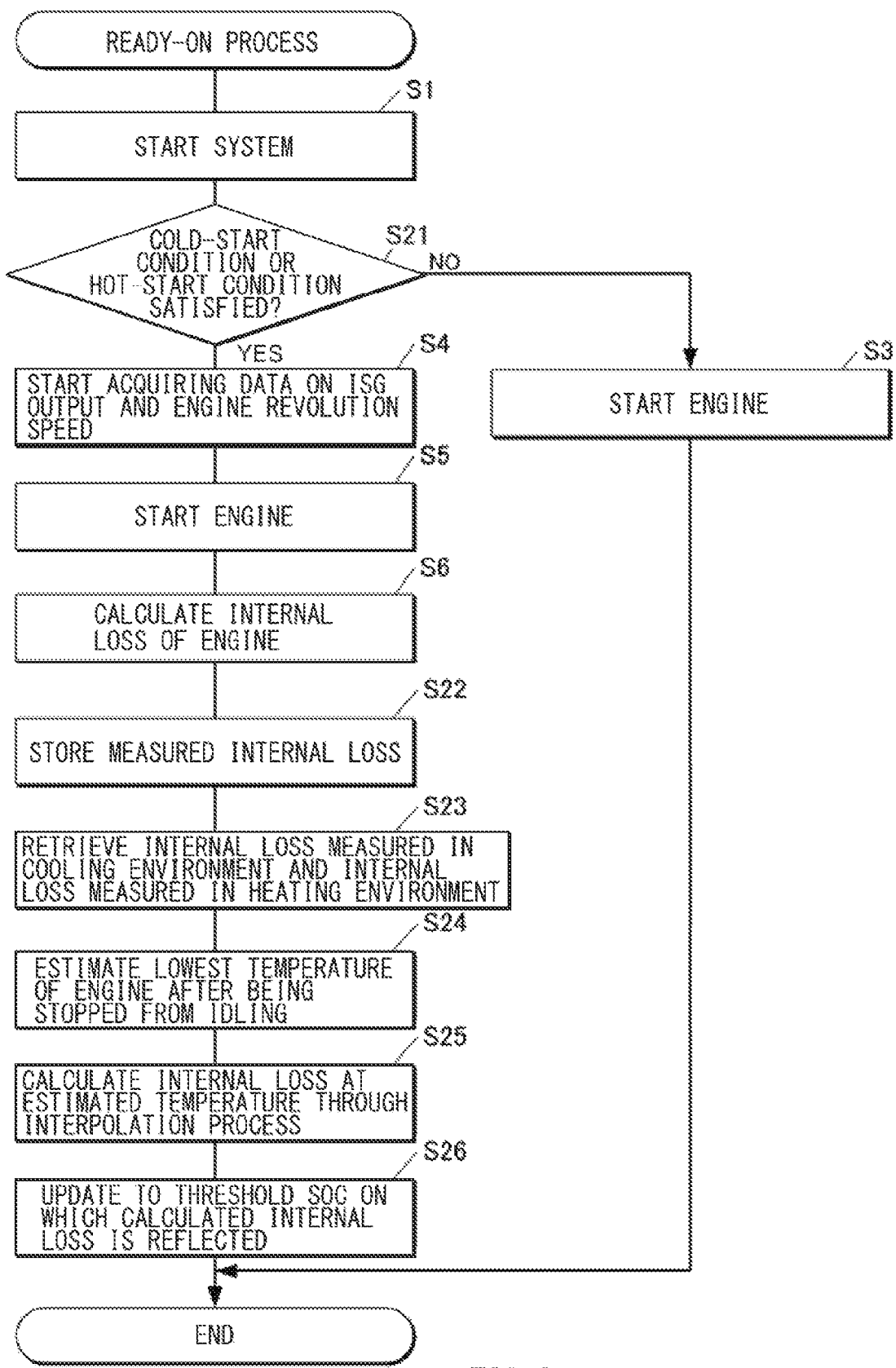
FIG. 6 is a flowchart of a ready-on process according to another modification example of the example embodiment of the technology.

FIG. 6 is a flowchart of a ready-on process according to Modification Example 2 of the first example embodiment. The ready-on process of Modification Example 2 may differ from the ready-on process described above in that the updated threshold SOC is calculated on the basis of an internal loss measured at a temperature determined through an interpolation process based on the internal loss of the engine 4 in the cooling environment and the internal loss of the engine 4 in the heating environment. Some of the steps in the ready-on process illustrated in FIG. 6 that are similar to those in the ready-on process illustrated in FIG. 4 are denoted with the same reference numerals to omit the description thereof.

In the ready-on process of Modification Example 2, the engine measuring unit 22B may start the system in Step S1, and then determine whether the cold-start condition or a hot-start condition is satisfied (Step S21). The hot-start condition may be a condition that the coolant in the engine 4 has a high temperature indicating that a hot start is being performed. If it is determined as "NO" in Step S21, the system control processor 22 may cause the process to transit to Step S3. If it is determined as "YES" in Step S21, the system control processor 22 may cause the process to proceed to Step S4.

The engine measuring unit 22B may measure an internal loss of the engine 4 in Step S6, and store the measured internal loss in the storage in Step S22. The internal loss may be stored in such a manner that it is distinguishable whether the internal loss of the engine 4 was measured in the cooling environment or the heating environment. For example, the measured internal loss may be stored together with a corresponding coolant temperature. Thereafter, the stop processing unit 22A may update the threshold SOC as follows (Steps S23 to S26).

In Step S23, the stop processing unit 22A may retrieve the internal loss stored together with a low coolant temperature and the internal loss stored together with a high coolant temperature from the latest internal losses stored in the storage. Thereafter, in Step S24, the stop processing unit 22A may estimate the lowest temperature of the engine 4 on the basis of the season and outside temperature at the time of current traveling. Further, in Step S25, the stop processing unit 22A may estimate an internal loss of the engine 4 at the estimated temperature determined in Step S24 through the interpolation process based on the internal losses retrieved in Step S23, namely, the internal loss of the engine 4 in the heating environment and the internal loss of the engine 4 in the cooling environment. In the interpolation process, the correlation between a temperature and an internal loss may be estimated on the basis of two known temperatures and the internal losses at the two known temperatures, and another internal loss at an unknown temperature (other than the known temperatures) may be determined on the basis of the estimated correlation. For example, in a case where a substantially linear relationship holds between the temperature and the internal loss, an arithmetic function may be obtained from the internal losses at the two known temperatures, and an internal loss of another temperature may be estimated on the basis of the arithmetic function.

In Step S26, the stop processing unit 22A may calculate a new threshold SOC corresponding to the engine 4 having the internal loss estimated in Step S25 on the basis of the internal loss estimated in Step S25, and update the currently-set threshold SOC to the new one. In Modification Example 2, the new threshold SOC may be calculated by adding a predetermined margin to the SOC of the auxiliary battery 8 required to restart the engine 4 cooled to the temperature estimated in Step S24 after being stopped from idling. The internal loss estimated in Step S25 may correspond to an internal loss measured at the estimated temperature, and thus have a correlation with the SOC of the auxiliary battery 8 required to restart the engine 4 including the estimated internal loss. The stop processing unit 22A may preliminarily hold an arithmetic function or a data table indicating the correlation between the internal loss and the threshold SOC corresponding to the internal loss, and determine the threshold SOC corresponding to the estimated internal loss using the arithmetic function or the data table. The arithmetic function or the data table may be obtained through an experiment or a simulation. After the threshold SOC is updated in Step S26, the ready-on process may end.

In Modification Example 2 described above, the internal loss of the engine 4 in the heating environment may be measured when the hot-start condition of the engine 4 is satisfied upon a start-up of the system. However, the internal loss of the engine 4 in the heating environment may be obtained also through a method of measuring the internal loss according to a second example embodiment described below. It is a rare case where the hot-start condition of the engine 4 is satisfied upon a start-up of the system. For example, the hot-start condition of the engine 4 may be satisfied only when the system of the vehicle 1 is stopped immediately after the vehicle 1 is caused to start traveling, and restarted immediately after the stop of the system. However, with the method of measuring the internal loss according to the second example embodiment, it is possible to measure the internal loss of the engine 4 in the heating environment more frequently.

According to the vehicle 1 and the system control processor 22 of Modification Example 2 described above, the stop processing unit 22A may estimate the internal loss at the lowest temperature of the engine 4 after being stopped from idling through the interpolation process based on the internal loss of the engine 4 in the cooling environment and the internal loss of the engine 4 in the heating environment. On the basis of the estimated internal loss, the stop processing unit 22A may set the threshold SOC. Based on such a threshold SOC, the determination as to whether to stop idling may be made with a reduced determination margin. Thus, the determination to stop idling is made more frequently even through the SOC of the auxiliary battery 8 has lowered close to the lower limit SOC barely enough to restart the engine 4. Accordingly, it is possible to further increase the chances to stop idling.

[Second Example Embodiment]

Figure 7:
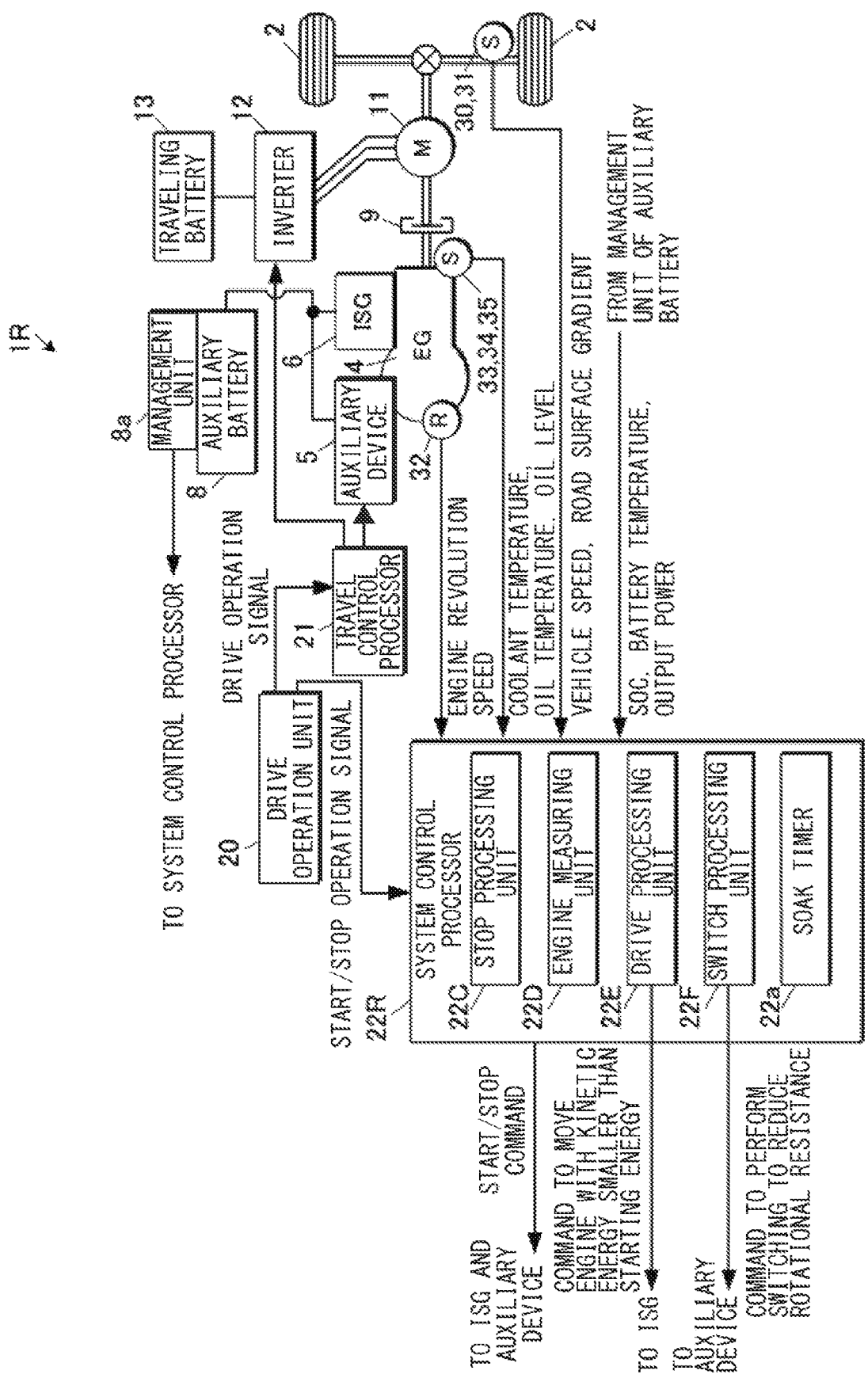
FIG. 7 is a block diagram illustrating an exemplary configuration of a vehicle including a start-stop control apparatus according to another example embodiment of the technology.

FIG. 7 illustrates a vehicle 1R including a start-stop control apparatus according to the second example embodiment of the technology. In the second example embodiment, components similar to those in the first example embodiment are denoted with the same reference numerals to omit the description thereof.

The vehicle 1R according to the second example embodiment may be a hybrid electric vehicle (HEV). The vehicle 1 R may include the drive wheels 2, the engine 4 that outputs drive power to the drive wheels 2, the auxiliary device 5 that drives the engine 4, the ISG 6 that starts or restarts the engine 4, the auxiliary battery 8 that supplies electric power to the ISG 6 and the auxiliary device 5, a traveling motor 11 that outputs drive power to the drive wheels 2, an inverter 12 that drives the traveling motor 11, a traveling battery 13 that supplies the inverter 12 with electric power for traveling, and an input clutch 9 that removes the engine 4 from the drive shaft in an electric vehicle (EV) traveling mode. In the EV traveling mode, the vehicle 1R may be driven only by drive power of the traveling motor 11 without using drive power of the engine 4. In contrast, in an engine traveling mode, the vehicle 1R may be driven by the drive power of the engine 4.

The vehicle 1R may further include the drive operation unit 20 that receives drive operations performed by the driver, the travel control processor 21 that controls traveling of the vehicle 1R, a system control processor 22R that controls the system of the vehicle 1R, the gradient sensor 31 that detects the gradient of a traveling road surface, the revolution sensor 32 that detects the revolution speed of the engine 4, the liquid temperature sensor 33 that measures the temperature of the coolant in the engine 4, the oil temperature sensor 34 that measures the temperature of the oil in the engine 4, and the level sensor 35 that detects the level of the oil in the engine 4.

The system control processor 22R may include a stop processing unit 22C that performs the start-stop control, an engine measuring unit 22D that measures an internal loss of the engine 4, a drive processing unit 22E that supplies the engine 4 with kinetic energy smaller than the energy required to start the engine 4 and thereby causing the engine 4 to generate a movement less than a starting movement of the engine 4, and a switch processing unit 22F that reduces the rotational resistance of the engine 4 while the engine 4 is not being driven. In one embodiment, the system control processor 22R may serve as a "start-stop control apparatus".

The system control processor 22R and the stop processing unit 22C may perform the start-stop control process illustrated in FIG. 2 as described in the first embodiment.

The input clutch 9 may switch the engine 4 between a connected state and a disconnected state under the control of the system control processor 22R. The engine 4 may be switched to the connected state by partially engaging the input clutch 9.

[Method of Measuring Internal Loss]

Figure 8:
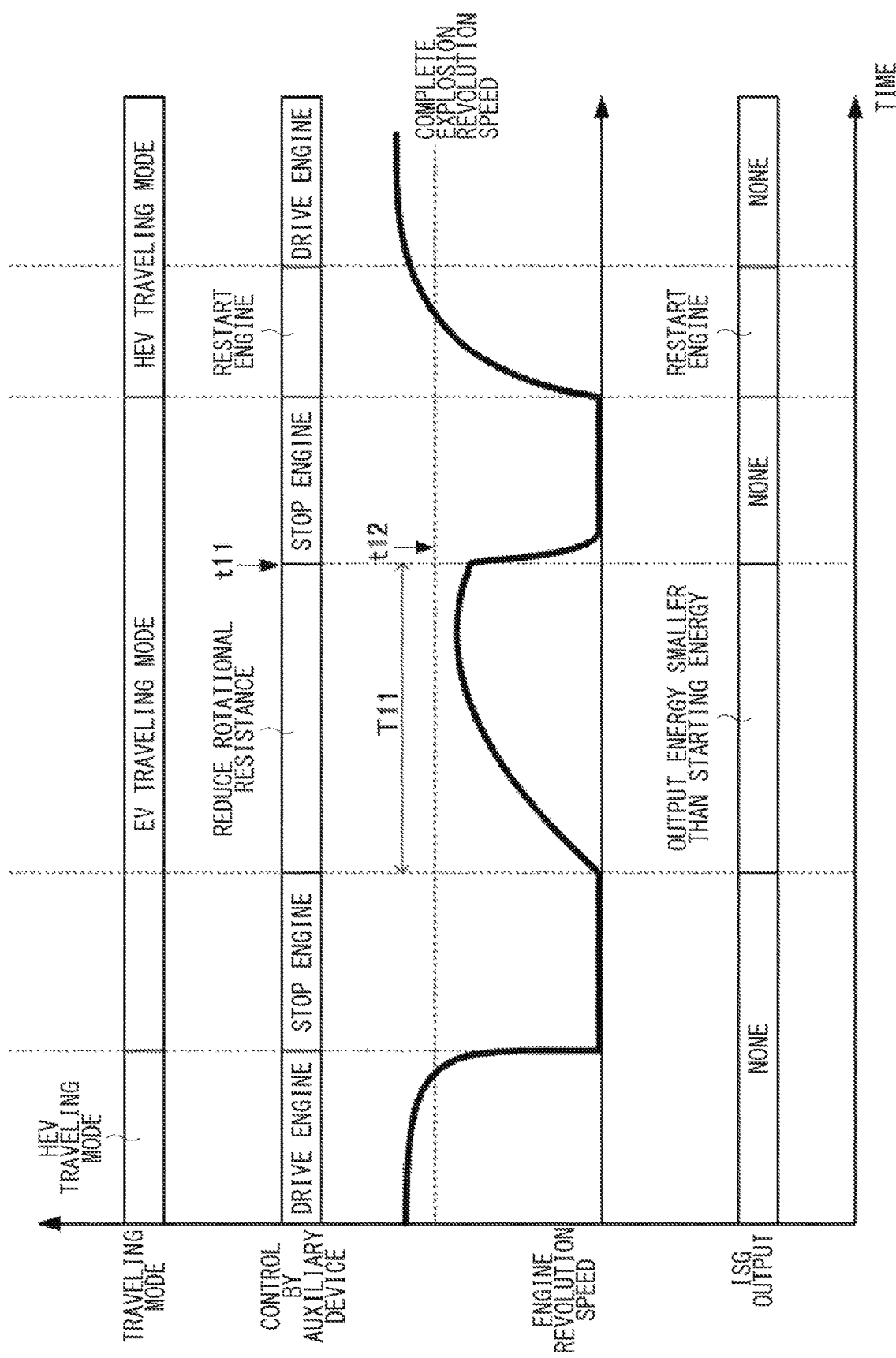
FIG. 8 is a time chart illustrating the internal loss measuring process according to the other example embodiment of the technology.

FIG. 8 is a time chart illustrating the internal loss measuring process according to the second example embodiment.

In the second example embodiment, the engine measuring unit 22D may measure the internal loss of the engine 4 in cooperation with the drive processing unit 22E and the switch processing unit 22F. That is, as illustrated in FIG. 8, the switch processing unit 22F may send the auxiliary device 5 a command to reduce the rotational resistance of the engine 4 while the engine 4 is being stopped (e.g., while the EV travel mode is being set). Thereafter, in a time T11, the drive processing unit 22E may cause the engine 4 to generate a movement less than the starting movement of the engine 4.

To cause the engine 4 to generate the movement less than the starting movement of the engine 4 in the time T11, the drive processing unit 22E may cause the ISG 6 to output drive power smaller than that required to start the engine 4. Alternatively, to cause the engine 4 to generate the movement less than the starting movement of the engine 4 in the time T11, the input clutch 9 may be partially engaged while the vehicle 1 is traveling in the EV traveling mode or coasting.

The switch processing unit 22F may reduce the rotational resistance of the engine 4 in the time T11 by switching the throttle to a full open mode or switching a valve in the exhaust pipe to a full-open mode. Alternatively, the switch processing unit 22F may reduce the rotational resistance of the engine 4 in the time T11 through other different methods, such as by transferring the engine oil from the crank case to another portion to reduce the oil level in the crank case or switching a dedicated mechanism for reducing the rotational resistance of the engine 4.

The engine measuring unit 22D may read data on the revolution speed of the engine 4 in the time T11. The data on the revolution speed obtained in the time T11 may include some parameters that change depending on the internal loss of the engine 4. For example, a maximum revolution speed in the time T11, the rate of increase or decrease in the revolution speed (e.g., an average value among values indicated by a curve), a time until the revolution speed increases to a predetermined value, and a time until the revolution speed decreases from the predetermined value to zero, may each have a correlation with the internal loss of the engine 4. The engine measuring unit 22D may preliminarily hold an arithmetic function or a data table indicating the correlation between each parameter and an internal loss of the engine 4. The engine measuring unit 22D may calculate the internal loss of the engine 4 on the basis of these parameters using the arithmetic function or the data table. The arithmetic function or the data table may be obtained through an experiment or a simulation.

After the time T11 in which the internal loss of the engine 4 is measured, the switch processing unit 22F may send the auxiliary device 5 a command to stop reducing the rotational resistance of the engine 4b at a timing t11, and the engine 4 may be stopped at a timing t12.

The engine measuring unit 22D measures the internal loss of the engine 4 when the predetermined environmental condition about the engine 4 is satisfied to exclude the environment-dependent elements. In the second example embodiment, the predetermined environmental condition may be a condition that the engine 4 is in the heating environment, that is, the coolant in the engine 4 has a temperature within a predetermined range indicating that the engine 4 is in the heating environment. The rotational resistance of the engine 4 decreases while the engine 4 is in the heating environment. Thus, it is possible to reduce the power consumption in the measurement of the internal loss of the engine 4 by performing the measurement when the predetermined environmental condition is satisfied.

[Threshold SOC Updating Process]

Figure 9:
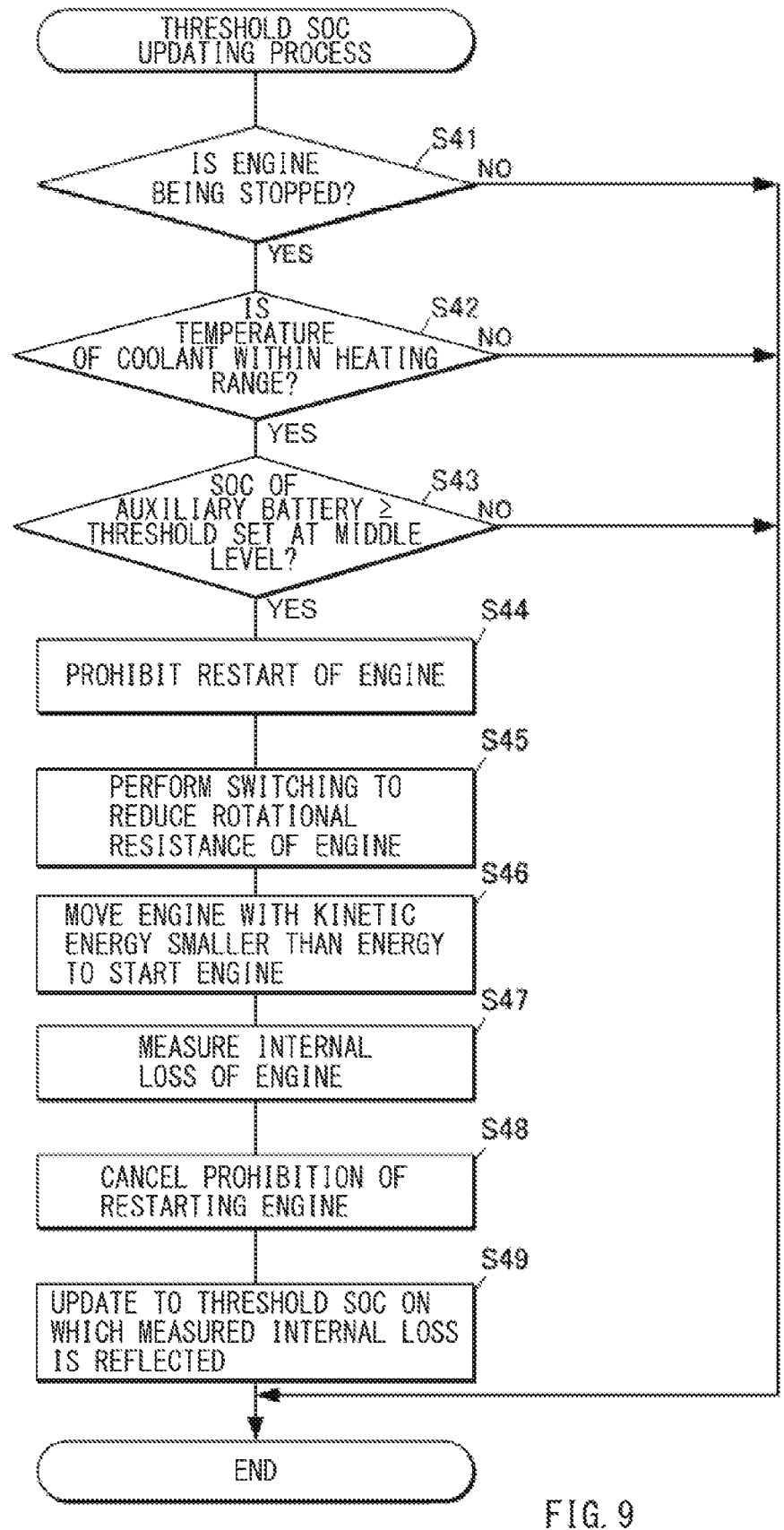
FIG. 9 is a flowchart illustrating a threshold SOC updating process performed by the system control processor according to the other example embodiment of the technology.

FIG. 9 is a flowchart illustrating a threshold SOC updating process performed by the system control processor according to the second example embodiment. The threshold SOC updating process may start at any timing while the system is activated. Upon the start of the threshold SOC updating process, the engine measuring unit 22D may determine whether the engine 4 is being stopped (Step S41), whether the coolant has a temperature within the predetermined range indicating that the engine 4 is in the heating environment (Step S42), and whether the SOC of the auxiliary battery 8 is greater than or equal to the threshold set at a middle level (Step S43). If it is determined as "NO" in any of Steps S41 to S43, the system control processor 22R may end the threshold SOC updating process without updating the threshold SOC.

In contrast, if it is determined as "YES" in all of Steps S41 to S43, the system control processor 22R may prohibit the engine 4 from restarting during the measurement of the internal loss (Step S44). Thereafter, the switch processing unit 22F may perform switching to reduce the rotational resistance of the engine 4 (Step S45). The drive processing unit 22E may supply the engine 4 with kinetic energy smaller than the energy required to start the engine 4 and thereby causing the engine 4 to generate a movement less than the starting movement of the engine 4 (Step S46). Thereafter, the engine measuring unit 22D may read the data on the revolution speed of the engine 4 in the time T11, and measure the internal loss of the engine 4 on the basis of the maximum revolution speed in the time T11 through the method described above, for example (Step S47). After the measurement of the internal loss, the system control processor 22R may cancel the prohibition of restarting the engine 4 (Step S48).

After the internal loss is measured in Step S46, the stop processing unit 22C may calculate a new threshold SOC on the basis of the measured internal loss and update the currently-set threshold SOC to the new one (Step S49). The internal loss measured in Step S47 may be an internal loss of the engine 4 heated at a substantially constant temperature. Thus, the internal loss has a correlation with the SOC of the auxiliary battery 8 required to restart the engine 4 including the internal loss and having been cooled. On the basis of an arithmetic function or a data table indicating the correlation, the stop processing unit 22C may thus calculate, in Step S49, the SOC of the auxiliary battery 8 required to restart the engine 4 including the internal loss and having been cooled. Additionally, the stop processing unit 22C may calculate a new threshold SOC by adding a margin to the calculated SOC of the auxiliary battery 8. After the currently-set threshold SOC is updated to the new one, the threshold SOC updating process may end.

According to the vehicle 1R and the system control processor (start-stop control apparatus) 22R according to the second example embodiment described above, the engine measuring unit 22D measures the internal loss of the engine 4. The stop processing unit 22C may determine the threshold SOC on the basis of the measured internal loss of the engine 4. The stop processing unit 22C determines whether to stop idling by comparing the SOC of the auxiliary battery 8 with the threshold SOC. In other words, the stop processing unit 22C may determine whether to stop idling on the basis of the internal loss of the engine 4 and the SOC of the auxiliary battery 8. Such a determination on which the measured value of the internal loss is reflected includes a reduced determination margin compared with the determination based on the largest internal loss. Thus, the determination to stop idling is made more frequently even through the SOC of the auxiliary battery 8 has lowered close to a lower limit SOC barely enough to restart the engine 4. Accordingly, it is possible to increase the chances to stop idling.

Further, according to the vehicle 1R and the system control processor 22R of the second example embodiment described above, the drive processing unit 22E may cause the engine 4 to generate the movement less than the starting movement of the engine 4, and the engine measuring unit 22D may measure the internal loss of the engine 4 by utilizing the generated movement of the engine 4. This allows the internal loss to be measured more frequently than in the case where the internal loss is measured at the start of the engine 4. That is, it is possible to increase the chances to measure the internal loss of the engine in the heating environment. Moreover, to measure the internal loss, the drive processing unit 22E may cause the engine 4 to generate the movement less than the starting movement of the engine 4. This reduces the energy consumption in the measurement of the internal loss and thus suppresses a decrease in the fuel economy of the vehicle 1R due to the measurement of the internal loss.

Further, according to the vehicle 1R and the system control processor 22R of the second example embodiment described above, the switch processing unit 22F may perform switching to reduce the revolution resistance of the engine 4 before the measurement of the internal loss. This reduces the energy consumption in the measurement of the internal loss and thus suppresses a decrease in the fuel economy of the vehicle 1R due to the measurement of the internal loss.

Further, according to the vehicle 1R and the system control processor 22R of the second example embodiment described above, the engine measuring unit 22D may measure the internal loss of the engine 4 in a case where the SOC of the auxiliary battery 8 is greater than or equal to the threshold SOC set at a middle level (refer to Step S43 in the threshold SOC updating process). Such a condition helps reduce the power consumption of the auxiliary battery 8 in the measurement of the internal loss and thus helps prevent the occurrence of failures in stopping idling due to a shortage of the SOC in the start-stop control performed afterwards.

Further, according to the vehicle 1R and the system control processor 22R of the second example embodiment described above, the engine measuring unit 22D may determine whether the predetermined environmental condition about the engine 4 is satisfied. If the predetermined environmental condition is satisfied (e.g., if the temperature of the coolant is within the predetermined temperature indicating that the engine is in the heating environment: refer to Step S42 in FIG. 9), the engine measuring unit 22D may measure the internal loss. The internal loss of the engine 4 includes the environment-dependent elements that change depending on environments, such as the cooling environment or the heating environment. Thus, according to the second example embodiment described above, the engine measuring unit 22D may measure the internal loss of the engine 4 in a case where the predetermined environmental condition is satisfied to exclude the environment-dependent elements. On the basis of the internal loss measured in this way, the stop processing unit 22C makes it possible to determine an appropriate threshold SOC. Moreover, setting the predetermined condition about the engine 4 in the heating environment as the condition for the measurement of the internal loss allows the internal loss of the engine 4 to be measured when the rotational resistance of the engine 4 has been decreased. Thus, it is possible to reduce the power required to generate the movement of the engine 4 less than the starting movement of the engine 4.

[Modification Example 3]

Figure 10:
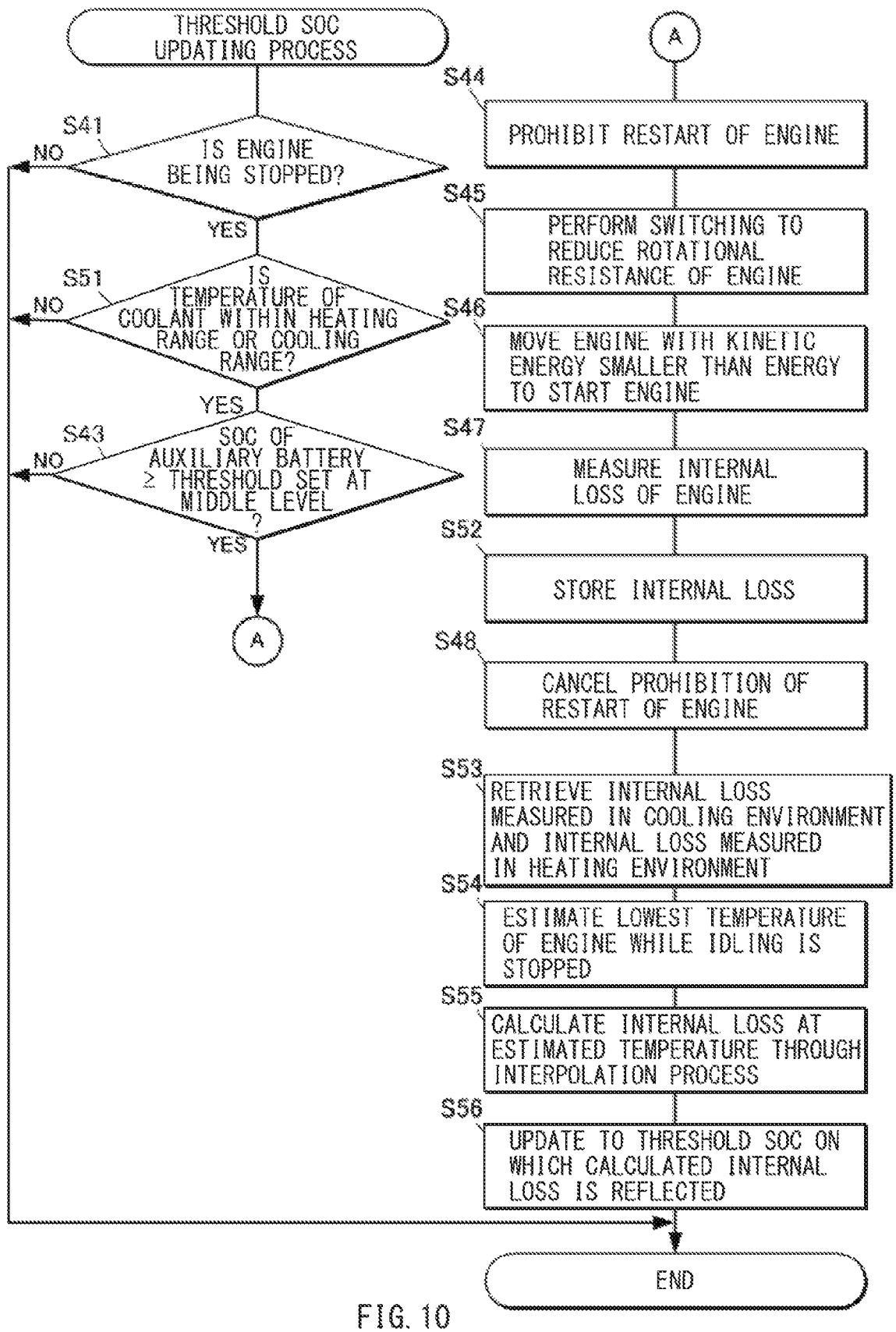
FIG. 10 is a flowchart illustrating a threshold SOC updating process according to a modification example of the other example embodiment of the technology.

FIG. 10 is a flowchart of a threshold SOC updating process according to Modification Example 3 of the second example embodiment. The threshold SOC updating process according to Modification Example 3 may differ from the threshold updating process described above in that the threshold SOC is calculated on the basis of the internal loss measured at a temperature determined through the interpolation process based on the internal loss of the engine 4 in the cooling environment and the internal loss of the engine 4 in the heating environment. Some of the steps in the threshold SOC updating process illustrated in FIG. 10 that are similar to those in FIG. 9 are denoted with the same reference numerals to omit the description thereof.

In the threshold SOC updating process according to Modification Example 3, the engine measuring unit 22D may determine whether the engine 4 is being stopped (Step S41). If the engine 4 is being stopped (Step S41: YES), the engine measuring unit 22D may determine whether the temperature of the coolant is within a first range indicating that the engine 4 is in the heating environment or a second range indicating that the engine 4 is in the cooling environment (Step S51). If it is determined as "YES" in Step S51, the process may transit to Step S43. Accordingly, in Modification Example 3, the measurement of the internal loss (Steps S44 to S48) may be performed while the engine 4 is in the heating environment or the cooling environment. After the measurement of the internal loss, the engine measuring unit 22D may store the measured internal loss in the storage in Step S52. The internal loss may be stored in such a manner that it is distinguishable whether the internal loss of the engine 4 was measured in the cooling environment or the heating environment. For example, the measured internal loss may be stored together with a corresponding coolant temperature.

After the measurement of the internal loss, the stop processing unit 22C may perform the threshold SOC updating process in Steps S53 to S56. First, in Step S53, the stop processing unit 22C may retrieve the internal loss stored together with the coolant temperature of the engine 4 in the cooling environment and the internal loss stored together with the coolant temperature of the engine 4 in the heating environment from the latest internal losses stored in the storage. Thereafter, in Step S54, the stop processing unit 22C may estimate the lowest temperature of the engine 4 on the basis of the season and outside temperature at the time of current traveling. Further, in Step S55, the stop processing unit 22C may estimate an internal loss of the engine 4 at the estimated temperature determined in Step S54 through the interpolation process based on the internal losses retrieved in Step S53, namely, the internal loss of the engine 4 in the heating environment and the internal loss of the engine 4 in the cooling environment. Thereafter, a new threshold SOC corresponding to the engine 4 including the estimated internal loss may be calculated on the basis of the internal loss estimated in Step S55, and the currently-set threshold SOC may be updated to the new one (Step S56). In Modification Example 3, the threshold SOC may be calculated by adding a predetermined margin to the SOC of the auxiliary battery 8 required to restart the engine 4 cooled to the temperature estimated in Step S54 after being stopped from idling. The internal loss estimated in Step S55 may correspond to an internal loss measured at the estimated temperature, and thus have a correlation with the SOC of the auxiliary battery 8 required to restart the engine 4 including the estimated internal loss. The stop processing unit 22C may determine the threshold SOC corresponding to the estimated internal loss using the arithmetic function or the data table indicating the correlation between the internal loss and the threshold SOC corresponding to the internal loss. The arithmetic function or the data table may be obtained through an experiment or a simulation, and stored in the stop processing unit 22C in advance. After the update of the threshold SOC, the threshold SOC updating process may end.

In Modification Example 3, the internal loss of the engine 4 in the cooling environment may be measured through the threshold SOC updating process performed at any timing. Alternatively, the internal loss of the engine 4 in the cooling environment may be measured through the ready-on process described in the first example embodiment.

According to the vehicle 1R and the system control processor 22R of Modification Example 3 described above, the stop processing unit 22C may estimate the internal loss at the lowest temperature of the engine 4 after being stopped from idling through the interpolation process based on the internal loss of the engine 4 in the cooling environment and the internal loss of the engine 4 in the heating environment. On the basis of the estimated internal loss, the stop processing unit 22C may set the threshold SOC. Based on such a threshold SOC, the determination as to whether to stop idling is made with a reduced determination margin. Thus, the determination to stop idling is made more frequently even through the SOC of the auxiliary battery 8 has lowered close to the lower limit SOC barely enough to restart the engine 4. Accordingly, it is possible to further increase the chances to stop idling.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

According to the foregoing example embodiments of the technology, the engine measuring unit measures the internal loss of the engine, and the stop processing unit determines whether to stop idling of the engine on the basis of the measured internal loss and the SOC of the auxiliary battery. Therefore, even if the internal loss changes depending on the total travel distance, the age of service, and the maintenance conditions of the vehicle, the stop processing unit makes it possible to determine whether to stop idling based on the internal loss of the engine after being changed. This reduces the determination margin included in the determination as to whether restarting the engine is possible. Accordingly, it is possible to increase the chances to stop idling.

One or more of the stop processing units 22A and 22C and the engine measuring units 22B and 22D in the start-stop control apparatus illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the stop processing units 22A and 22C and the engine measuring units 22B and 22D. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the stop processing units 22A and 22C and the engine measuring units 22B and 22D in the start-stop control apparatus illustrated in FIG. 1.

The invention claimed is:

1. A start-stop control apparatus to be mounted in a vehicle including an engine, a starter motor configured to restart the engine, and an auxiliary battery configured to supply electric power to the starter motor, the start-stop control apparatus comprising:
 a stop processing unit configured to stop idling of the engine while the vehicle is being stopped; and
 an engine measuring unit configured to measure an internal loss of the engine,
 wherein the stop processing unit is configured to perform a determination process of determining whether to stop the idling of the engine on a basis of the internal loss measured by the engine measuring unit and a state of charge of the auxiliary battery, and
 wherein the engine measuring unit is configured to:
  determine whether a condition of cold starting the engine is met; and
  measuring the internal loss when the condition of cold starting the engine is met.

2. The start-stop control apparatus according to claim 1, further comprising
 a gradient sensor configured to detect a gradient of a road surface, wherein
 the internal loss measured when the gradient of the road surface detected by the gradient sensor is greater than or equal to a threshold gradient is not reflected on the determination process.

3. The start-stop control apparatus according to claim 1, wherein
 the engine measuring unit is configured to measure the internal loss when an environment of the engine is a heating environment in which the engine is heated and when the environment of the engine is a cooling environment in which the engine is cooler than the engine in the heating environment, and the stop processing unit is configured to estimate an internal loss of the engine at a temperature different from a temperature of the heating environment and a temperature of the cooling environment on a basis of the internal loss measured in the heating environment and the internal loss measured in the cooling environment, and perform the determination process on a basis of the internal loss estimated.

4. The start-stop control apparatus according to claim 2, wherein the engine measuring unit is configured to measure the internal loss when an environment of the engine is a heating environment in which the engine is heated and when the environment of the engine is a cooling environment in which the engine is cooler than the engine in the heating environment, and the stop processing unit is configured to estimate an internal loss of the engine at a temperature different from a temperature of the heating environment and a temperature of the cooling environment on a basis of the internal loss measured in the heating environment and the internal loss measured in the cooling environment, and perform the determination process on a basis of the internal loss estimated.

5. The start-stop control apparatus according to claim 1, wherein the stop processing unit is further configured to:

determine whether the state of charge of the auxiliary battery is equal to or greater than a threshold;

stop idling of the engine when the state of charge of the auxiliary battery is equal to or greater than a threshold; and update the threshold based on the internal loss measured when the condition of cold starting the engine is met.

6. The start-stop control apparatus according to claim 1, wherein the stop processing unit is further configured to:

determine that the condition of cold starting the engine is met when a time from a previous stop of a system of the vehicle to a start-up of the system is greater than or equal to a predetermined value, and a temperature of a coolant for the engine is less than or equal to a predetermined temperature before the engine is started for the first time after the start-up of the system; and in response to determining that the condition of cold starting the engine is met, measure the internal loss based on at least one of output energy of the starter motor during a predetermined period after the starter motor starts rotating and rise rate of a revolution speed of the engine during the predetermined period after the starter motor starts rotating.

7. A start-stop control apparatus to be mounted in a vehicle including an engine, a starter motor configured to restart the engine, and an auxiliary battery configured to supply electric power to the starter motor, the start-stop control apparatus comprising:

circuitry configured to stop idling of the engine while the vehicle is being stopped, and measure an internal loss of the engine, wherein the circuitry is configured to perform a determination process of determining whether to stop the idling of the engine on a basis of the internal loss measured and a state of charge of the auxiliary battery, and wherein the circuitry is configured to:

determine whether a condition of cold starting the engine is met; and measuring the internal loss when the condition of cold starting the engine is met.

8. The start-stop control apparatus according to claim 7, wherein the circuitry is further configured to:

determine whether the state of charge of the auxiliary battery is equal to or greater than a threshold;

stop idling of the engine when the state of charge of the auxiliary battery is equal to or greater than a threshold; and update the threshold based on the internal loss measured when the condition of cold starting the engine is met.

9. The start-stop control apparatus according to claim 7, wherein the circuitry is further configured to:

determine that the condition of cold starting the engine is met when a time from a previous stop of a system of the vehicle to a start-up of the system is greater than or equal to a predetermined value, and a temperature of a coolant for the engine is less than or equal to a predetermined temperature before the engine is started for the first time after the start-up of the system; and in response to determining that the condition of cold starting the engine is met, measure the internal loss based on at least one of output energy of the starter motor during a predetermined period after the starter motor starts rotating and rise rate of a revolution speed of the engine during the predetermined period after the starter motor starts rotating.

\* \* \* \* \*